US011818252B2

(12) United States Patent
Kirk et al.

(10) Patent No.: US 11,818,252 B2
(45) Date of Patent: Nov. 14, 2023

(54) CONFIGURING NETWORKED DEVICES SHARING A COMMON FIRMWARE KEY

(71) Applicant: Toshiba Global Commerce Solutions Holdings Corporation, Tokyo (JP)

(72) Inventors: Charles R Kirk, Raleigh, NC (US); Sharon Freedman, Cary, NC (US); Suzanne M Bleakley, Cary, NC (US)

(73) Assignee: TOSHIBA GLOBAL COMMERCE SOLUTIONS HOLDINGS CORPORATION, Tokyo (JP)

( * ) Notice: Subject to any disclaimer, the term of this patent is extended or adjusted under 35 U.S.C. 154(b) by 62 days.

(21) Appl. No.: 16/815,436

(22) Filed: Mar. 11, 2020

(65) Prior Publication Data
US 2021/0288796 A1  Sep. 16, 2021

(51) Int. Cl.
*H04L 9/08* (2006.01)
*H04L 67/00* (2022.01)
*G06F 21/60* (2013.01)

(52) U.S. Cl.
CPC .......... *H04L 9/0838* (2013.01); *G06F 21/602* (2013.01); *H04L 9/0819* (2013.01); *H04L 67/34* (2013.01)

(58) Field of Classification Search
CPC ..... H04L 9/0838; H04L 9/0819; H04L 67/34; G06F 21/602
See application file for complete search history.

(56) References Cited

U.S. PATENT DOCUMENTS 8,214,880 B1 * 7/2012 Wu ..................... H04L 63/0876
726/3
8,549,588 B2   10/2013 Wynn et al.
9,338,130 B2   5/2016 Von Huben et al.
9,608,996 B2   3/2017 Farber
10,104,549 B2  10/2018 Fogle-Weekley et al.
10,129,818 B2  11/2018 Watt et al.
(Continued)

FOREIGN PATENT DOCUMENTS

CN  205017592 U   2/2016
WO  2017023813 A1  2/2017

OTHER PUBLICATIONS

Wang, E., "Safeguarding Sensitive Data: How to Keep Your Wi-Fi Network Secure", Sep. 16, 2014, pp. 1-10, retrieved on Jan. 9, 2019, retrieved from internet: https://www.techradar.com/news/networking/wi-fi/safeguarding-sensitive-data-how-to-keep-your-wi-fi-network-secure-1265251.

*Primary Examiner* — Noura Zoubair
*Assistant Examiner* — Zoha Piyadehghibi Tafaghodi
(74) *Attorney, Agent, or Firm* — COATS & BENNETT, PLLC

(57) ABSTRACT

Networked devices in a communications network share a common firmware key. Using the common firmware key, one networked device can encrypt configuration data it uses to operate in the network for distribution to other networked devices of the same or similar type. The networked devices that receive the encrypted configuration data then use the common firmware key to decrypt the encrypted configuration data, and using the decrypted configuration data, self-configure to operate on the network. This allows for the secure distribution of configuration data, as well as the self-configuration of networked devices without exposing the sensitive data needed for such configuration to a human.

18 Claims, 6 Drawing Sheets

(56) References Cited

U.S. PATENT DOCUMENTS

| | | | |
|---|---|---|---|
| 2009/0164668 A1* | 6/2009 | Duckett | H04L 67/34 710/9 |
| 2013/0034046 A1 | 2/2013 | Ishii et al. | |
| 2013/0166899 A1* | 6/2013 | Courtney | G06F 9/44505 713/100 |
| 2014/0247941 A1 | 9/2014 | Gu et al. | |
| 2014/0268229 A1* | 9/2014 | Kempka | G06F 13/387 358/1.15 |
| 2016/0205203 A1* | 7/2016 | Choi | H04L 67/16 709/222 |
| 2016/0364723 A1* | 12/2016 | Reese | G06Q 20/38215 |
| 2017/0295448 A1 | 10/2017 | McCann et al. | |
| 2017/0351504 A1* | 12/2017 | Riedl | H04L 67/34 |
| 2017/0372084 A1* | 12/2017 | Murashita | H04L 9/0822 |
| 2018/0167392 A1 | 6/2018 | Zakaria | |
| 2018/0176970 A1 | 6/2018 | Gupta et al. | |
| 2018/0332041 A1 | 11/2018 | Fan et al. | |
| 2019/0087577 A1* | 3/2019 | Doliwa | G06F 21/44 |
| 2019/0158353 A1* | 5/2019 | Johnson | H04L 67/34 |
| 2019/0347440 A1* | 11/2019 | Langley | G06F 21/602 |
| 2021/0075671 A1* | 3/2021 | Li | H04W 12/08 |

* cited by examiner

CONFIGURING NETWORKED DEVICES SHARING A COMMON FIRMWARE KEY

TECHNICAL FIELD

The present disclosure relates generally to configuring networked devices, and more particularly to configuring networked devices that share a same firmware key to operate in a communication network.

BACKGROUND

Networked devices can use various security methods to prevent unauthorized access to a communications network. Most conventional methods require a user to provide sensitive data a private key, password, or some form of username and password combination. One of the most popular methods is the WiFi Protected Access (WPA) Pre-Shared Key (PSK). Other popular methods currently in use are WPA2 Enterprise with Protected Extensible Authentication Protocol (PEAP) and MICROSOFT'S Challenge-Handshake Authentication Protocol Version 2 (MSChapV2). One difference between these techniques is that WPA PSK uses the same password for all clients (or users) while the WPA2 Enterprise with PEAP and MSChapV2 techniques allow a unique ID and password for each client.

Setting up networked devices (e.g., WiFi clients) that use these and other conventional security mechanisms to prevent unauthorized access to a network requires that the person setting up the networked device know the correct username, password, and/or other sensitive data. However, there may be a high likelihood of compromising the networked devices and the communications network if the person setting up the client does not adequately secure this information.

DETAILED DESCRIPTION

Embodiments of the present disclosure provide a networked device and corresponding method for configuring a networked device, such as a WiFi client, for example, without exposing any of the sensitive data required for the configuration process to a human. With a networked device configured to operate according to the present disclosure, companies and enterprises, for example, are able to utilize personnel having less training than is normally required to configure a device without compromising security. Additionally, networked devices configured according to the present embodiments help prevent intentional attempts by malicious parties to discover network passwords.

To accomplish this function, the present embodiments configure a networked device currently operating in a communications network to encrypt configuration data for other networked devices using a common firmware key. Notably, the common firmware key is shared with other networked devices yet to be added to the communications network. Whenever a new networked device is being added to the communications network, the encrypted configuration data is sent to that device. The newly-added networked device then decrypts the encrypted configuration data utilizing its common firmware key, and self-configures itself to operate on the communications network using the decrypted configuration data.

Figure 1:
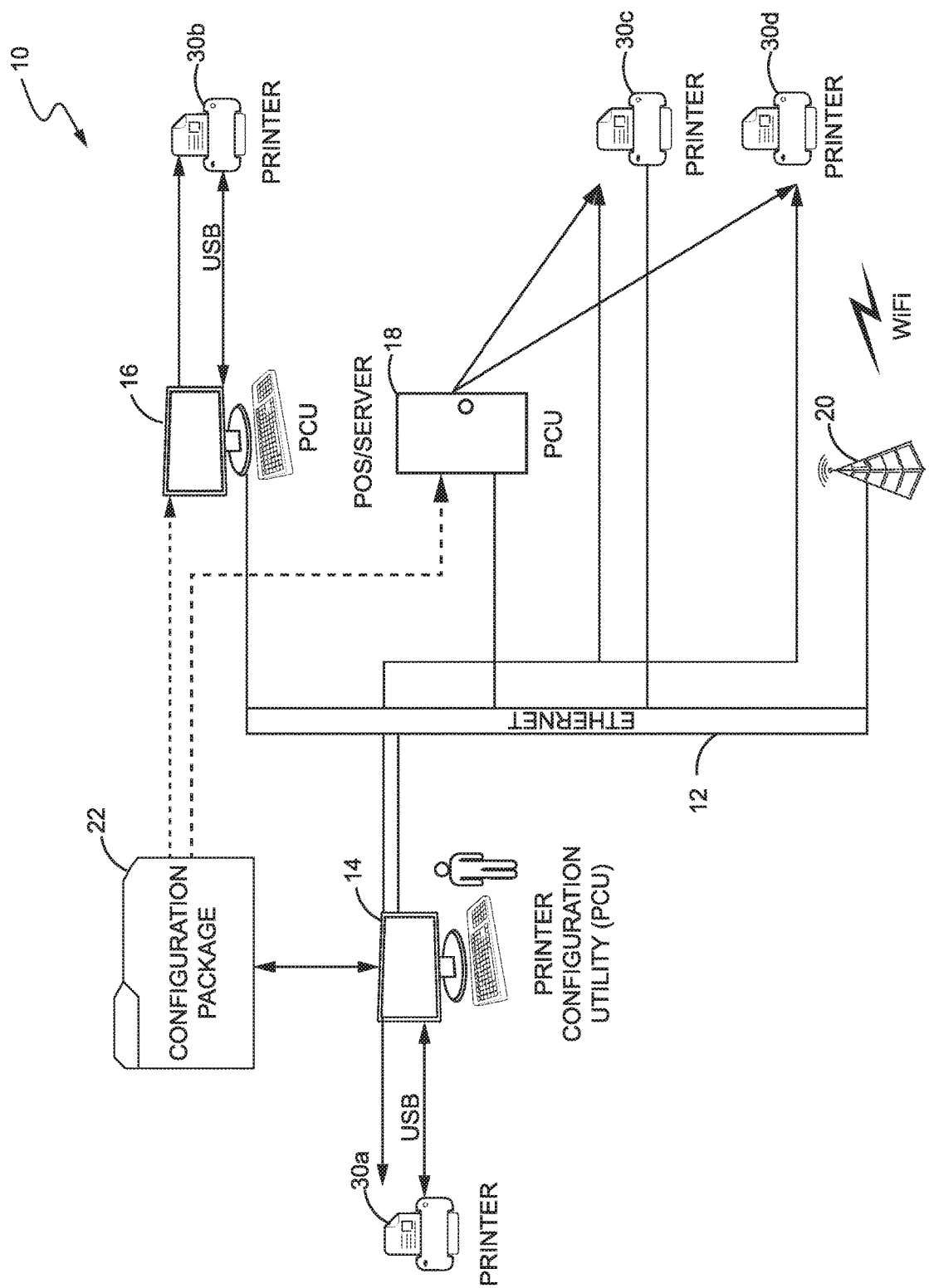
FIG. 1 is block diagram illustrating a communications system configured according to one embodiment of the present disclosure.

Turning now to the drawings, FIG. 1 is a block diagram illustrating a communications system 10 configured according to one embodiment of the present disclosure. In this embodiment, system 10 is described in terms of being a communications network (e.g., a Local Area Network (LAN) or Wide Area Network (WAN) associated with a retail store. However, those of ordinary skill in the art will readily appreciate that this is for illustrative purposes only, and that system 10 may comprise any type of communications network and be associated with entities other than retail entities.

As seen in FIG. 1, system 10 comprises a data network 12 (e.g., an ETHERNET network) communicatively interconnecting a control computer 14, a Point-Of-Sale (POS) device 16, a POS server 18, and in some embodiments, a Wireless Fidelity (WiFi) Access Node (AN) 20. Additionally, system 10 comprises a plurality of networked devices 30a, 30b, 30c, 30d (collectively, 30), which in this embodiment, are illustrated as being networked peripheral devices, such as printers. In some cases, the networked devices, such as networked device 30a, 30c, and 30d, are standalone peripheral devices configured with the circuitry and software needed to communicate data and information to other entities connected to network 12. In other cases, however, networked devices 30 may be integrated into, or connected to, another peripheral device. For example, in one aspect, networked device 30b may be integrated into a POS device 16 (e.g., a POS device with a printer). In another aspect, networked device 30b may be a standalone peripheral device connected to a POS device 16 via a USB interface. In these cases, networked device 30b could communicate with other devices on network 12 via POS device 16. Regardless of whether networked device 30 is or is not a standalone peripheral device, however, each networked device 30 in system 10 is configured to communicate with the other networked devices 30 in system 10, as well as with the other entities in system 10, using well-known protocols messaging procedures.

As stated above, conventional methods of installing and configuring a networked device to operate on network 12 require the person performing the procedures to know the particular username/password combination a priori. This can be problematic, however. For example, the person performing the procedures may not adequately secure the sensitive information needed to access network 12, such as a username/password combination, for example, from other untrusted individuals. To help prevent such individuals from compromising system 10, the network operators (e.g., the retail store owners) could always hire or utilize better trained personnel. However, device configuration tasks are generally not very complex, and thus, do not normally warrant such resource costs. Therefore, the present disclosure configures a networked device (e.g., networked device 30a) to configure other networked devices (e.g., networked device 30b, 30c, and/or 30d) without disclosing any of the sensitive information required for the setup and configuration of those devices to a human.

To accomplish this, one embodiment of the present disclosure initially configures a networked device (e.g., networked device 30a) in a secure environment by a trusted individual. As part of this initial, basic setup, hardware circuitry on networked device 30a is configured to include a common firmware key. The hardware circuitry may comprise, for example, communications circuitry, such as an ETHERNET or network card, used by networked device 30a to communicate data via network 12. In cases where networked device 30a is capable of wireless communications via AN 20, the hardware circuitry may comprise a wireless adaptor.

The common firmware key may comprise, for example, a symmetrical private key shared by all networked devices 30. That is, each networked device 30 is preconfigured to include the common firmware key before it is connected to network 12 (e.g., during a manufacturing phase or during an initial basic set-up phase). Once its basic configuration is complete, networked device 30a is configured with the sensitive data needed for it to access and operate on network 12 (e.g., username/password combination), and thereafter, operates normally in network 12. Additionally, using the common firmware key, network device 30a encrypts the sensitive configuration data it needs to operate on network 12, generates a setup file including the encrypted configuration data, and sends that setup file to control computer 14 for distribution to other networked devices 30 so that they, too, can be configured to operate in network 12.

For example, consider a situation where networked device 30d is being added to network 12. Such a situation may occur, for example, when networked device 30d is replacing an existing device that is being removed for repair or maintenance, or when networked device 30d is being added as a new device on network 12. As stated above, although networked device 30d may have a basic configuration in place, including the common firmware key it shares with the other networked devices 30, it may not be configured with the sensitive data specifically needed to communicate on network 12. Therefore, the control computer 14 is configured to detect when networked device 30d is initially connected to network 12 (e.g., via a Plug-n-Play function). Responsive to that detection, control computer 14 sends a configuration package 22 via network 12 to networked device 30d. According to the present disclosure, the configuration package 22 comprises the setup file generated by networked device 30a, which in turn, includes the encrypted configuration data encrypted by networked device 30a using its common firmware key.

Upon receipt of the configuration package 22, networked device 30d launches a configuration utility. The utility extracts the encrypted configuration data from the setup file, and uses the common firmware key at networked device 30d to decrypt the encrypted configuration data. Networked device 30d then self-configures itself for operation in network 12 using the decrypted configuration data.

Figure 2:
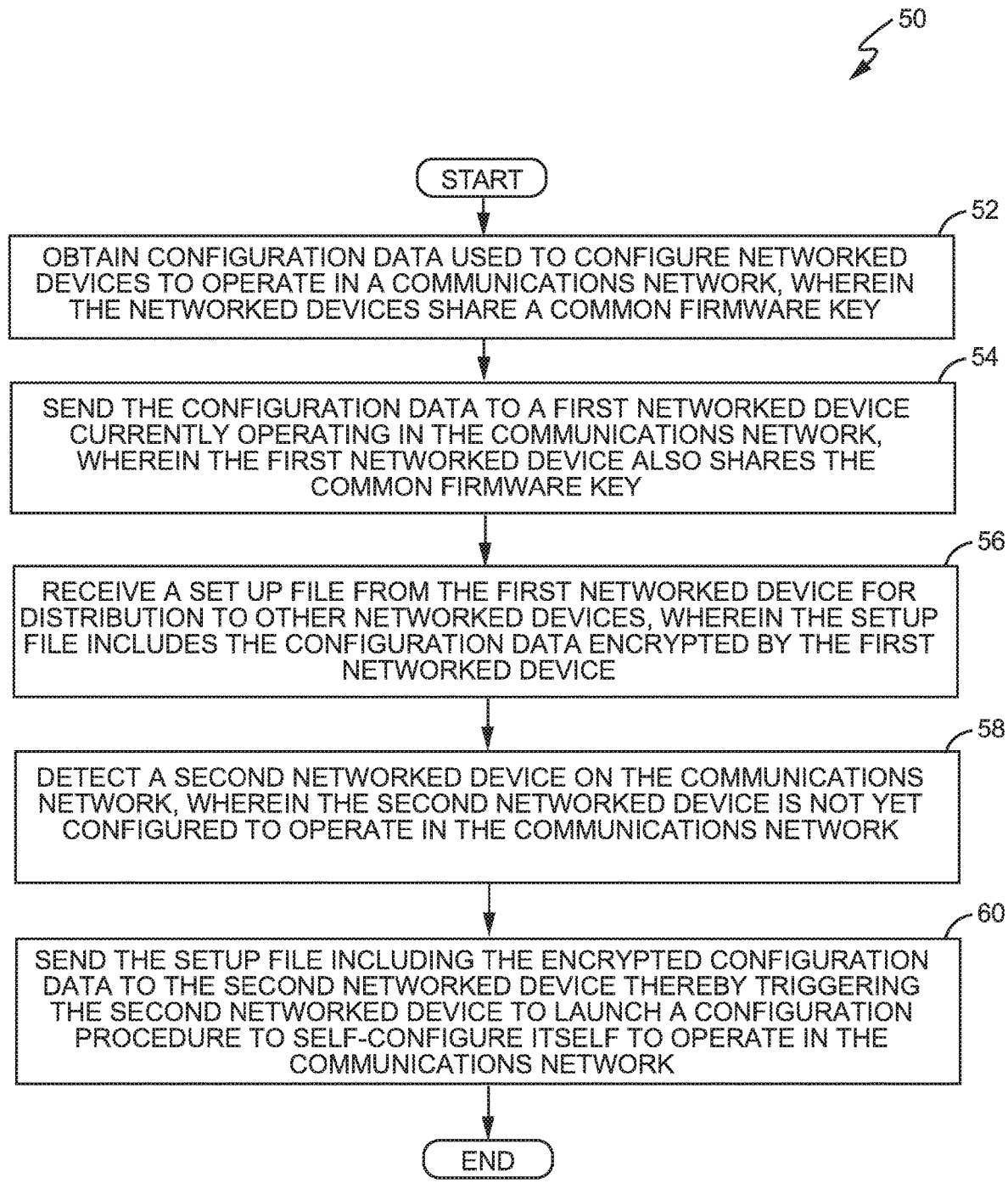
FIG. 2 is a flow diagram illustrating a method for configuring a networked device to operate on a communications network according to one embodiment of the present disclosure.

FIG. 2 is a flow diagram illustrating a method 50 for configuring a networked device 30d to operate in network 12 according to one embodiment of the present disclosure. In this embodiment, method 50 is implemented by control computer 14 operating in network 12.

As seen in FIG. 2, method 50 begins with control computer 14 obtaining the configuration data that will be used to configure network devices 30 to operate in network 12. In one embodiment, the configuration data is retrieved by control computer 14 from its own internal memory, or from an external memory source, such as a database. In another embodiment, however, the configuration data is received from a network operator who enters the configuration data into control computer 14. Regardless, however, all network devices 30 share the same common firmware key (box 52).

Control computer 14 then sends the configuration data, in unencrypted form, to a first networked device 30a currently operating in the network 12 (box 54), and in response, receives a setup file from the first networked device 30a (box 56). As previously described, the first networked device 30a shares the same common firmware key as the other networked devices 30, and the setup file received from the first networked device includes the configuration data encrypted by the first networked device 30a.

Subsequently, control computer 14 detects that a second networked device 30b is connected to network 12 (box 58). The second networked device 30b does have an initial basic configuration that includes the common firmware key, but it is not yet configured to operate in network 12. This is because the second networked device 30b is not yet configured with the sensitive data needed to operate on network 12. Responsive to detecting the second networked device 30b, control computer 14 sends the setup file, including the encrypted configuration data, to the second networked device 30b (box 60). This triggers the second networked device 30b to execute a configuration procedure to configure itself to operate in network 12 using the configuration data received in the setup file.

Figure 3:
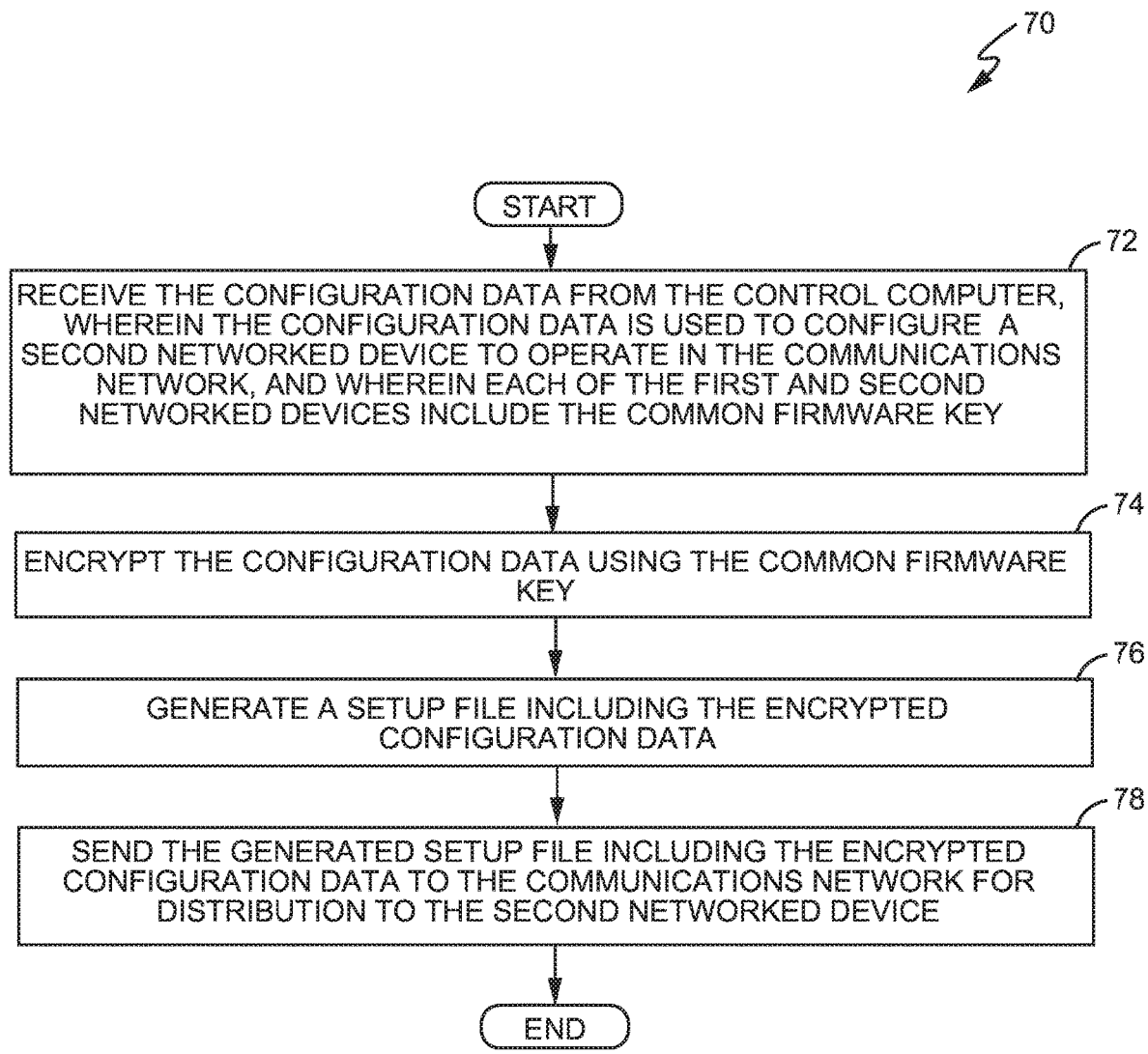
FIG. 3 is a flow diagram illustrating a method for encrypting configuration data distributed to a networked device according to one embodiment of the present disclosure.

FIG. 3 is a flow diagram illustrating a method 70 for encrypting the configuration data distributed to networked devices 30 according to one embodiment of the present disclosure. Method 70 is described as being implemented at networked device 30a. However, those of ordinary skill in the art should appreciate that this is for illustrative purposes only, and that any of the networked devices 30 are configured according to the present disclosure to implement method 70.

As seen in FIG. 3, method 70 begins with networked device 30a receiving the configuration data in unencrypted form from control computer 14 (box 72). As stated above, the configuration data is to be used to configure a second networked device (e.g., networked device 30d) to operate in network 12, and both networked device 30a and the second networked device 30d share the same common firmware key.

Responsive to receiving the configuration data, networked device 30a utilizes the common firmware key to encrypt the configuration data (box 74). By way of example only, networked device 30a uses, in one embodiment, any symmetric key algorithm known in the art to encrypt the configuration data. Networked device 30a then generates a setup file including the encrypted configuration data (box 76) and sends the setup file to the control computer 14 for distribution to the second networked device 30d (box 78).

Figure 4:
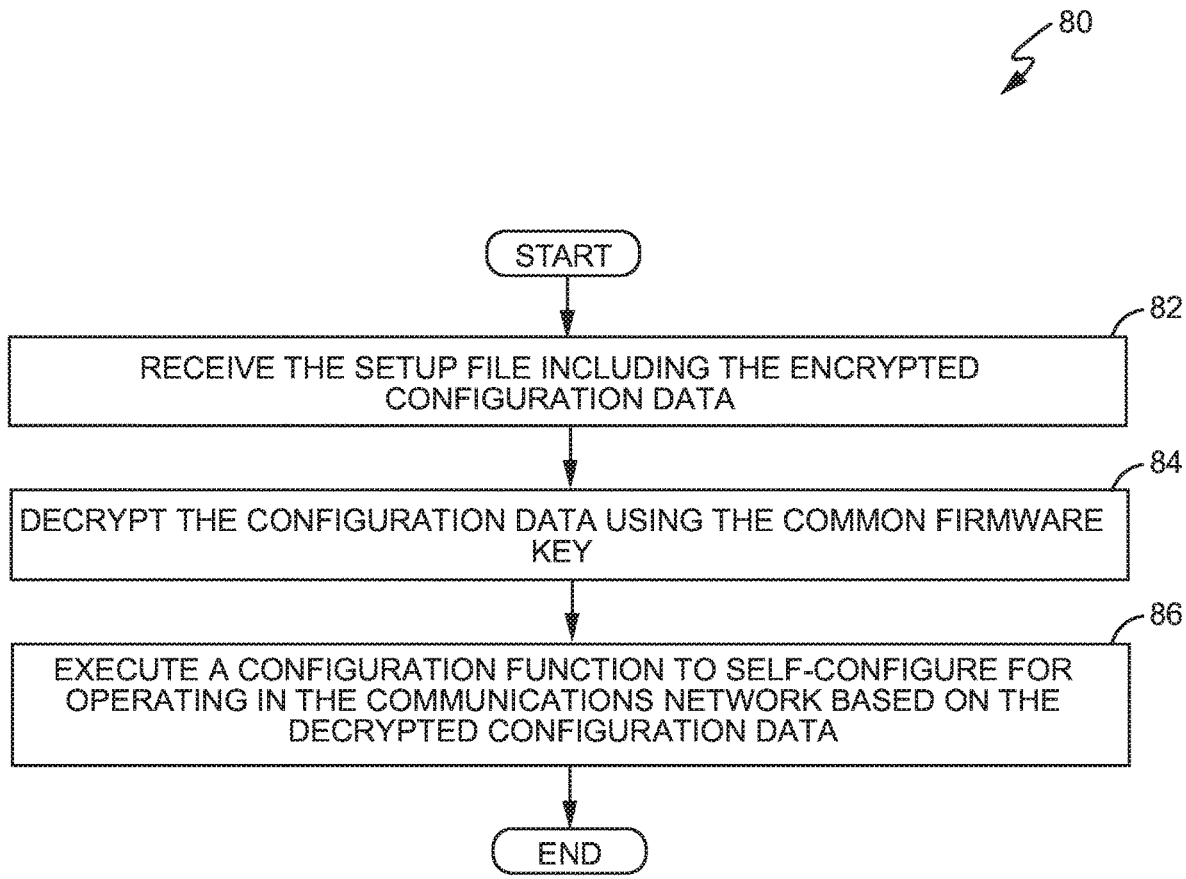
FIG. 4 is a flow diagram illustrating a method for decrypting the distributed configuration data and executing a self-configuration process according to one embodiment of the present disclosure.

FIG. 4 is a flow diagram illustrating a method 80, implemented at the second networked device 30d, for example, for decrypting the encrypted configuration data and executing a self-configuration process using the decrypted configuration data according to one embodiment of the present disclosure. As seen in method 80, the second networked device 30d receives the setup file that includes the encrypted configuration data (box 82). Responsive to receiving the setup file, the second networked device 30a utilizes its common firmware key to decrypt the encrypted configuration data within the setup file (box 84). Because the common firmware key at the second networked device 30d is the same common firmware key used by networked device 30a to encrypt the configuration data, the second networked device 30d can also utilize any known symmetric key algorithm to decrypt the encrypted configuration data. Once the configuration data is decrypted, the second networked device executes a self-configuration program and, using the decrypted configuration data, configures itself for operation in network 12 (box 86).

Figure 5:
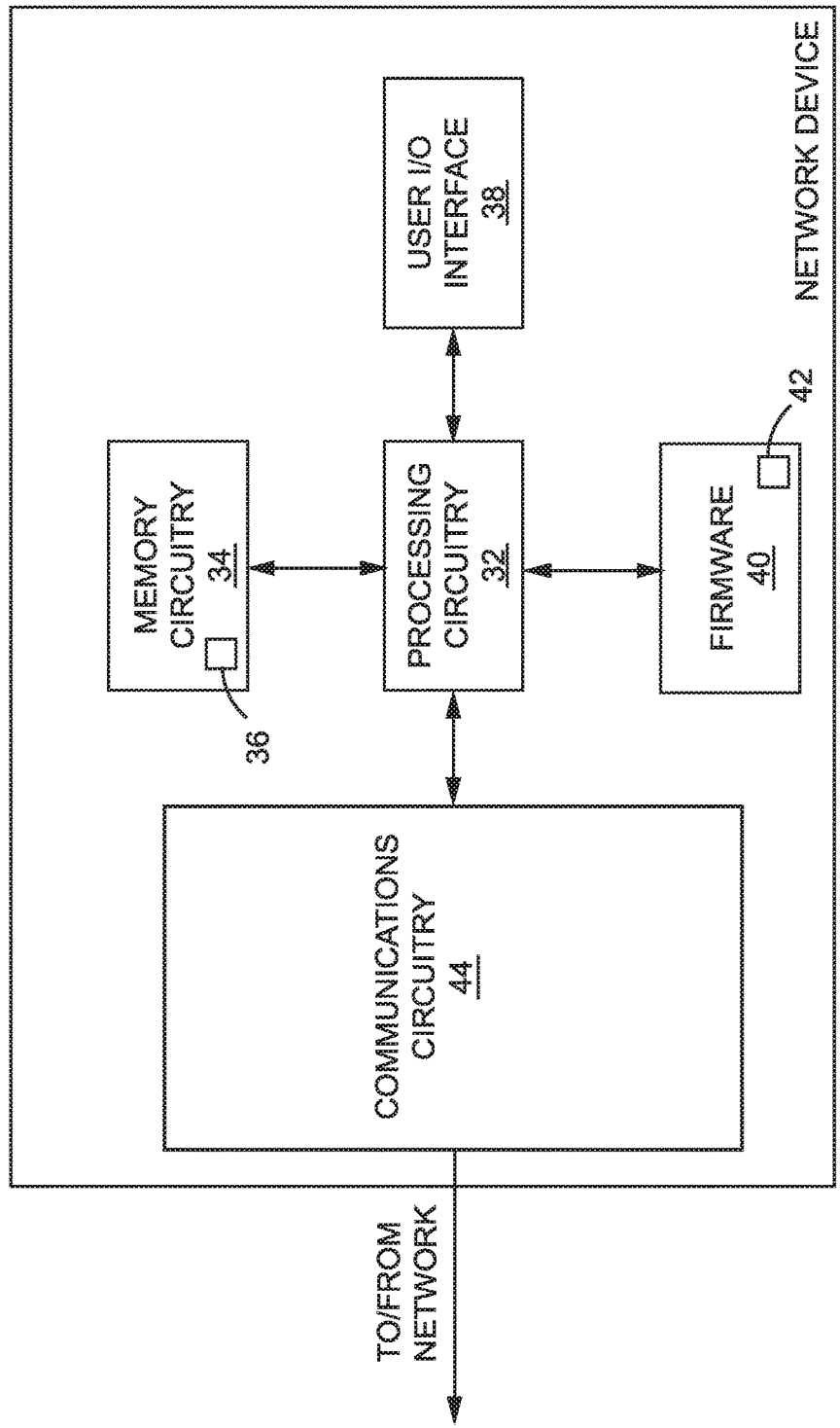
FIG. 5 is schematic block diagram illustrating some of the component parts of a networked device configured to encrypt and decrypt configuration data using a common firmware key according to one embodiment of the present disclosure.

FIG. 5 is schematic block diagram illustrating some of the component parts of a networked device 30 configured to encrypt and decrypt configuration data using a common firmware key according to one embodiment of the present disclosure. Those of ordinary skill in the art should appreciate that the components illustrated in FIG. 5 are merely exemplary, and that networked device 30 may comprise other components not explicitly shown in FIG. 5.

As seen in FIG. 5, networked device 30 is a peripheral device (e.g., a printer or a POS device equipped with a printer) and comprises processing circuitry 32, memory circuitry 34 storing a control program 36, a user input/output (I/O) interface 38, firmware 40 storing a common firmware key 42, and a communications interface circuit 44.

Processing circuitry 32 comprises one or more microprocessors, hardware circuits, firmware or a combination thereof. In the exemplary embodiments described herein, processing circuitry 32, as previously described, is configured to encrypt configuration data received as plain text from control computer 14 for distribution to other networked devices 30, and to decrypt the encrypted configuration data distributed by control computer 14. Both the encryption and decryption functions are implemented by networked device 30a using the common firmware key 44, as previously described. Further, when decrypting the configuration data, processing circuitry 32 is also configured to execute a self-configuration function that uses the decrypted configuration data to configure the networked device 30 to operate in network 12.

Memory circuitry 34 comprises a non-transitory computer readable medium that stores executable program code and data used by the processing circuitry 32 for operation. In this embodiment, the program code and data comprises a control program 36 that, when executed by processing circuitry 32, configures networked device 30 to perform the functions previously described. Memory circuitry 34 may include both volatile and non-volatile memory, and may comprise random access memory (RAM), read-only memory (ROM), and electrically erasable programmable ROM (EEPROM) and/or flash memory. Additionally or alternatively, memory circuitry 34 may comprise discrete memory devices, or be integrated with one or more microprocessors in the processing circuitry 32.

The user I/O interface 38 comprises one or more input devices and display devices to enable a user to interact with and networked device 30. Such devices may comprise any type of device for inputting data including, but not limited to, keyboards, number pads, push buttons, touchpads, touchscreens, or voice activated inputs. The display devices that comprise user I/O interface 38 may comprise, for example, a liquid crystal display (LCD) or light emitting diode (LED) display, or a touchscreen display that also functions as a user input device.

Firmware 40 comprises the circuitry and software required for the low-level control of one or more functions of networked device 30. In one embodiment, for example, the firmware 40 is integrated with a WiFi adaptor embedded in networked device 30. Thus, firmware 40 may be utilized for communicating with network 12 via AN 20, and in at least some embodiments, integrated in communications circuitry 44. In other embodiments, firmware 40 is not associated with the communications abilities of networked device 30, but rather, is configured to perform other functions, such as network monitoring functions, data manipulation functions, or operating systems functions, for example. Regardless of its specific function, however, firmware 40 has a common firmware key 42 that is shared with all other networked devices 30, and that is used, as described above, to encrypt and decrypt configuration data used to configure networked devices 30 for operation in network 12.

The communications interface circuitry 44 comprises, in one embodiment, a transceiver circuit and/or interface circuit for communicating with remote devices, such control computer 14, associated with the retail store. For example, using communications interface circuitry 44, networked device 30 can, as previously described, send and receive encrypted configuration data for use in self-configuring to operate in network 12. In this regard, the communications interface circuitry 44 according to embodiments of the present disclosure may comprise a WiFi interface, a cellular radio interface, a BLUETOOTH interface, an Ethernet interface, or other similar interface for communicating over network 12 or a wireless communication link to AN 20.

Figure 6A:
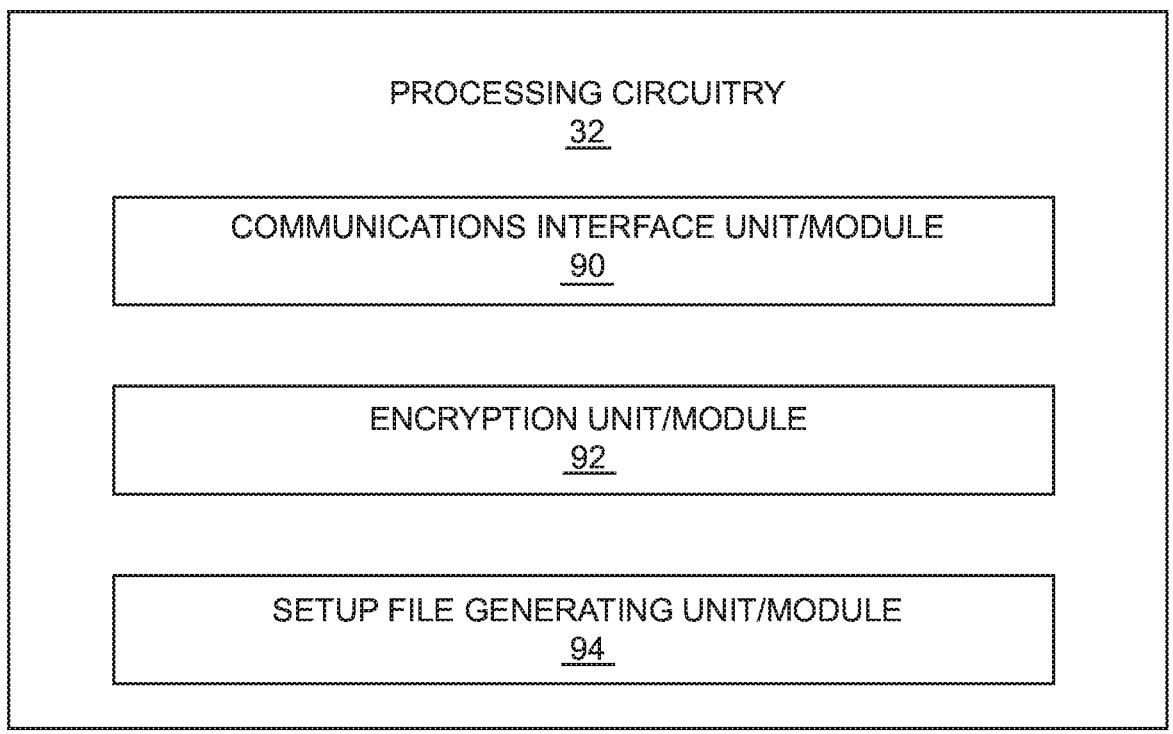
FIG. 6A is a schematic block diagram of a computer program product that configures a networked device to encrypt configuration data for other networked devices using a common firmware key according to one embodiment of the present disclosure.

FIG. 6A is a schematic block diagram of a computer program product that configures a networked device 30 to encrypt configuration data for other networked devices 30 using a common firmware key 42 according to one embodiment of the present disclosure. As seen in FIG. 6A, the computer program product comprises a plurality of units/modules including a communications interface unit/module 90, an encryption unit/module 92, and a setup file generating unit/module 94.

The communications interface unit/module 90 comprises program code that is executed by processing circuitry 32 to facilitate communicating data and information with one or more devices via network 12. Such devices include, but are not limited to, control computer 14 and other networked devices 30. As described above, the data being communicated includes configuration data that has been encrypted by a network device 30, and that is being distributed to other networked devices 30 in network 12.

The encryption unit/module 92 comprises program code that is executed by processing circuitry 32 to encrypt the configuration data received from control computer 14. Particularly, in one embodiment, the encryption unit/module 92 obtains the common firmware key 42 from firmware 40 and, using that key, encrypts the configuration data received from control computer 14 using any symmetric-key algorithm known in the art, as previously described.

The setup file generating unit/module 94 comprises program code that is executed by processing circuitry 32 to generate the setup file distributed to the other networked devices 30. More particularly, the setup file generating unit/module 94 obtains the encrypted configuration data output by the encryption unit/module 92 and includes the encrypted configuration data in the setup file. Other sensitive information may also be included in the setup file. Once complete, the setup file unit/module 94 sends the generated setup file to control computer 14 via communications interface circuitry 90. In some embodiments, the generated setup file is also encrypted by networked device 30 using the common firmware key.

Figure 6B:
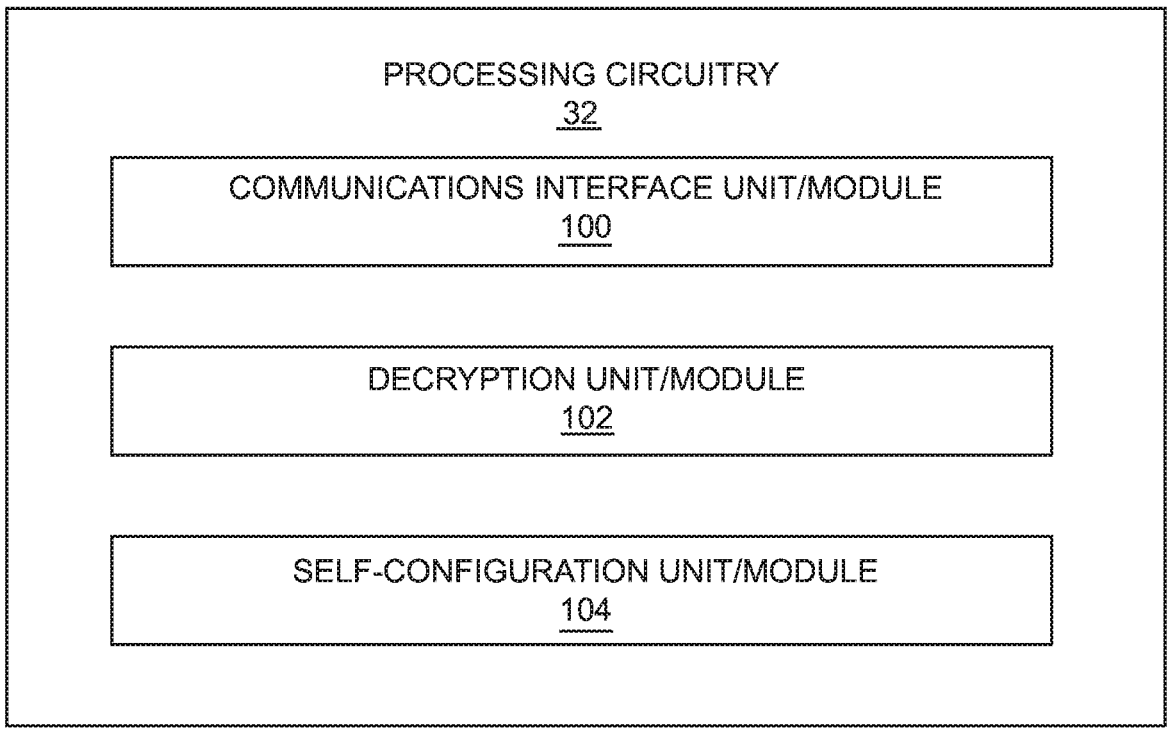
FIG. 6B is a schematic block diagram of a computer program product that configures a networked device to decrypt configuration data using a common firmware key according to one embodiment of the present disclosure.

FIG. 6B is a schematic block diagram of a computer program product that configures a networked device 30 to decrypt configuration data using the common firmware key 42 according to one embodiment of the present disclosure. As seen in FIG. 6B, the computer program product comprises a plurality of units/modules including a communications interface unit/module 100, an decryption unit/module 102, and a self-configuration unit/module 104.

The communications interface unit/module 90 comprises program code that is executed by processing circuitry 32 to facilitate communicating data and information with one or more devices via network 12. Such devices include, but are not limited to, control computer 14, POS server 16, and other networked devices 30. As above, the data being communicated using communications interface unit/module 90 includes configuration data that has been encrypted by a network device 30, and received from control computer 14.

The decryption unit/module 102 comprises program code that is executed by processing circuitry 32 to decrypt the encrypted configuration data received from control computer 14. In one embodiment, the decryption unit/module 102 obtains the common firmware key 42 from firmware 40 and, using that key, decrypts the configuration data received in encrypted form from control computer 14 using any symmetric-key algorithm known in the art, as previously described.

The self-configuration unit/module 104 comprises program code that is executed by processing circuitry 32 to self-configure networked node 30 to operate in network 12. As previously described, networked device 30 can be configured to automatically execute the self-configuration unit/module 104 responsive to receiving the encrypted configuration data and/or successfully decrypting the received encrypted configuration data.

The present embodiments may, of course, be carried out in other ways than those specifically set forth herein without departing from essential characteristics of the invention. For example, it is well-known by those of ordinary skill in the art that firmware 40 can have different versions. The version numbers are used to identify the iterations of the firmware 40, and may change when the firmware 40 is modified. However, according to the present disclosure, encryption and decryption of the configuration data does not depend on the version of firmware 40. That is, according to the present embodiments, networked device 30a can encrypt the configuration data under a first version of firmware 40, and networked device 30d can decrypt that same encrypted configuration data under a second, different version of firmware 40. This is because the common firmware key 42 remains static (i.e., unchanged) across different versions of firmware 40).

Further, the previous embodiments illustrate the networked devices 30 as being printers. However, this is merely for clarity and ease of discussion. According to the present disclosure, networked devices 30 may be any type of peripheral device operating on network 12 including, but not limited to, display devices, POS devices, and scanning devices. Thus, not only can one printer currently operating in network 12 prepare, encrypt, and distribute the data needed for other printers to operate in network 12, but scanning devices, POS devices, and the like can perform the same functions for other devices of the same type.

Therefore, the present embodiments are to be considered in all respects as illustrative and not restrictive, and all changes coming within the meaning and equivalency range of the appended claims are intended to be embraced therein.

What is claimed is:

1. A method comprising:
receiving, at a first networked device operating in the communications network, configuration data used to configure a second networked device to operate in the communications network:
wherein the configuration data comprises sensitive data needed by the second networked device to access and operate in the communications network;
wherein the second networked device has a basic configuration that allows the second networked device to indicate to the first networked device that it has been initially connected to the communications network, but is not configured with the sensitive data upon being initially connected to the communications network;
wherein each of the first and second networked devices comprise point-of-sale (POS) devices and include respective hardware circuits with each hardware circuit being preconfigured to comprise a respective shared common firmware key;
wherein the shared common firmware key of each of the first and second networked devices comprises a symmetrical private key that protects one or more encrypted components of the respective hardware circuit; and
wherein the hardware circuit of the first networked device is a same type of hardware circuit of the second networked device;
detecting, by the first networked device, that the second networked device has been initially connected to the communications network; and
responsive to the detecting:
encrypting, at the first networked device and using the shared common firmware key included in the hardware circuit of the first networked device, the configuration data that includes the sensitive data;
generating, at the first networked device, a setup file comprising the encrypted configuration data that was encrypted using the shared common firmware key; and
sending, by the first networked device, the setup file to the communications network for distribution to the second networked device without exposing the sensitive data to a user of the first networked device, wherein the setup file is configured to trigger the second networked device to launch a configuration procedure to configure itself to access and operate in the communications network according to the sensitive data.

2. The method of claim 1 wherein generating, at the first networked device, a setup file comprising the encrypted configuration data that was encrypted using the shared common firmware key comprises generating, at the first networked device, the setup file for the second networked device including the encrypted configuration data.

3. The method of claim 1 wherein the first and second networked devices are of a same device type.

4. The method of claim 3 wherein the first and second networked devices are printers.

5. The method of claim 1 wherein the communications network comprises a Wireless Fidelity (WiFi) network.

6. The method of claim 1 wherein the shared common firmware key is associated with firmware in each of the first and second networked devices.

7. The method of claim 6 wherein a version of the firmware in the first networked device and the version of the firmware in the second networked device are the same.

8. The method of claim 6 wherein a version of the firmware in the first networked device and the version of the firmware in the second networked device are different.

9. The method of claim 1 wherein encrypting, at the first networked device and using the shared common firmware key included in the hardware circuit of the first networked device, the configuration data comprises encrypting the configuration data using a symmetric key algorithm.

10. The method of claim 1 wherein the second networked device is configured to decrypt the configuration data using a symmetric key algorithm and the shared common firmware key.

11. A networked device comprising:
communications circuitry configured to communicate messages via a communications network; and
processing circuitry communicatively connected to the communications circuitry, and while the networked device is operating in a communications network, is configured to:
receive configuration data used to configure a target networked device to operate in the communications network;
wherein the configuration data comprises sensitive data needed by the target networked device to access and operate in the communications network;
wherein the target networked device has a basic configuration that allows the target networked device to indicate to the networked device that it has been initially connected to the communications network, but is not configured with the sensitive data upon being initially connected to the communications network;
wherein each of the networked device and the target networked device comprise point-of-sale (POS) devices and include respective hardware circuits with each hardware circuit being preconfigured to comprise a respective shared common firmware key comprising a symmetrical private key that protects one or more encrypted components of the respective hardware circuit; and
wherein the hardware circuit of the networked device is a same type of hardware circuit of the target networked device;
detect that the target networked device has been initially connected to the communications network; and responsive to the detecting:
encrypt the configuration data using the shared common firmware key included in the hardware circuit of the networked device;
generate a setup file comprising the encrypted configuration data that was encrypted using the shared common firmware key; and
send the setup file to the communications network for distribution to the target networked device without exposing the sensitive data to a user of the networked device, wherein the setup file is configured to trigger the target networked device to launch a configuration procedure to configure itself to access and operate in the communications network according to the sensitive data.

12. The networked device of claim 11 wherein the processing circuitry is further configured to generate the setup file comprising the encrypted configuration data for the target networked device.

13. The networked device of claim 11 wherein the networked device and the target networked device are the same device type.

14. The networked device of claim 13 wherein the networked device and the target networked device are printers.

15. The networked device of claim 11 wherein the shared common firmware key is associated with firmware in each of the networked device and the target networked device.

16. The networked device of claim 15 wherein a version of the firmware in the networked device and the version of the firmware in the target networked device are the same.

17. The networked device of claim 15 wherein a version of the firmware in the networked device and the version of the firmware in the target networked device are different.

18. A non-transitory computer readable medium comprising computer program code stored thereon that, when executed by processing circuitry of a first networked device operating in a communications network, configures the first networked device to:
receive configuration data used to configure a second networked device to operate in the communications network;
wherein the configuration data comprises sensitive data needed by the second networked device to access and operate in the communications network;
wherein the second networked device has a basic configuration that allows the second networked device to indicate to the first networked device that it has been initially connected to the communications network, but is not configured with the sensitive data upon being initially connected to the communications network;
wherein each of the first networked device and the second networked device comprise point-of-sale (POS) devices and include respective hardware circuit with each hardware circuit being preconfigured to comprise a respective shared common firmware key comprising a symmetrical private key that protects one or more encrypted components of the respective hardware circuit; and
wherein the hardware circuit of the first networked device is a same type of hardware circuit of the second networked device;
detect that the target networked device has been initially connected to the communications network; and responsive to the detecting:
encrypt the configuration data using the shared common firmware key included in the hardware circuit of the first networked device;
generate a setup file comprising the encrypted configuration data that was encrypted using the shared common firmware key; and
send the setup file to the communications network for distribution to the second networked device without exposing the sensitive data to a user of the first networked device, wherein the setup file is configured to trigger the second networked device to launch a configuration procedure to configure itself to access and operate in the communications network according to the sensitive data.

* * * * *